United States Patent
Chliwnyj et al.

[11] Patent Number: 5,844,814
[45] Date of Patent: Dec. 1, 1998

[54] OPTICAL POSITION SENSING DEVICE AND METHOD FOR SUB-MICRON MEASUREMENT

[75] Inventors: Alex Chliwnyj; Dennis Peter Rienstra; Steven Carter Wills, all of Tucson, Ariz.

[73] Assignee: International Business Machines Corporation, Armonk, N.Y.

[21] Appl. No.: 722,960

[22] Filed: Sep. 27, 1996

[51] Int. Cl.[6] ........................................ G11B 5/55
[52] U.S. Cl. ............... 364/559; 364/571.03; 364/571.04; 324/207.13; 324/254; 360/77.12; 360/126
[58] Field of Search .................... 364/559, 571.03, 364/571.04, 550; 324/207.13, 117 R, 253, 254, 212; 360/48, 60, 77.12, 106; 395/185.07, 185.06

[56] References Cited

U.S. PATENT DOCUMENTS

| | | |
|---|---|---|
| 4,691,101 | 9/1987 | Leonard .......................... 250/231 SE |
| 4,809,110 | 2/1989 | Hertrich ................................ 360/122 |
| 4,904,861 | 2/1990 | Epstein et al. ....................... 250/214 C |
| 5,339,598 | 8/1994 | Denison et al. ......................... 360/113 |
| 5,377,052 | 12/1994 | Guzman et al. ........................ 360/106 |
| 5,432,652 | 7/1995 | Comeaux et al. .................... 360/77.12 |
| 5,525,902 | 6/1996 | Nakajima ................................ 324/212 |

*Primary Examiner*—Emanuel T. Voeltz
*Assistant Examiner*—Kamini S. Shah
*Attorney, Agent, or Firm*—R. M. Sullivan; D. A. Shifrin

[57] ABSTRACT

A high resolution, independent position sensor is provided, having application in a magnetic tape drive and other environments in which a linear or angular position is to be monitored. Analog outputs from an inexpensive, low resolution optical encoder are processed to correct gain and offset distortions and are used as the basis for an interpolation process. If a code strip having a 127-micron grating is used, a resolution of about 0.125 microns can be achieved.

3 Claims, 5 Drawing Sheets

OPTICAL POSITION SENSING DEVICE AND METHOD FOR SUB-MICRON MEASUREMENT

TECHNICAL FIELD OF THE INVENTION

The present invention relates to optical position sensing, and in particular, to an apparatus and method for measuring a position with sub-micron resolution.

BACKGROUND OF THE INVENTION

While the present invention will be described within a magnetic tape drive environment, other applications in which it is necessary to accurately know or control the position of a component and to which the present invention may be incorporated include (no limitation being intended) printers, plotters, surveying equipment and automated factory equipment in which either linear or rotary displacement is monitored.

In the information storage industry, increases in the data capacity of tape have been achieved with thinner tape substrates and with various data compression techniques. Advances in the magnetic tape media and tape head technologies have generated further increases in data capacity by increasing both the number of tracks on a magnetic tape (by narrowing the width of each track) and the number of read/write elements on the head. For example, the IBM 3490-E magnetic tape subsystem for ½ inch wide tape employs a fixed-position head with 36 read/write elements and has a tape capacity of about 800 megabytes (MB). 3490-E tape drives perform bi-directional linear recording (as opposed to helical scan recording) and, to reduce the number of tape rewinds and thereby improve performance, sets of head elements are interleaved. In an interleaved head, element pairs having a read-element/write-element configuration alternate with element pairs having an opposite, write-element/read-element configuration, each pair of elements being associated with one track on the tape. When the tape travels in one direction, the element pairs having one configuration access the corresponding tracks (such as the even numbered tracks) in a read-after-write manner and when the tape travels in the opposite direction, the element pairs having the other configuration access the other corresponding tracks (the odd numbered tracks), also in a read-after-write manner.

The number of tracks which can be established on the tape media has been limited by the number of read/write elements which could be fabricated on a head to write/read narrower tracks. Therefore, tape drives have recently been designed to process a tape using a head having fewer sets of read/write elements than there are tracks on the tape. The tracks are divided into groups, each group containing the same number of tracks as there are read/write element pairs in the head. To access all of the groups, the head is indexed transversely relative to the tape path, such as with a stepper motor or voice coil driven springs, to a number of discrete positions, the number being equal to the number of groups of tracks. For example, a head having eight read/write pairs can accommodate a tape having 24 tracks if the tracks are divided into three groups of eight tracks each and the head has three index positions. To reduce the distance the head travels between index positions, the groups are preferably interleaved. In the preceding example, each of three groups contained eight tracks. If tracks are numbered consecutively (0–23), group interleaving results in tracks 0, 3, 6, . . ., and 21 being in the first group and accessible by the head being indexed to position 0. Similarly, tracks 1, 4, 7, . . . and 22 are in the second group, accessible in index position 1, while tracks 2, 5, 8, 23 are in the third group, accessible in index position 2.

Despite such advances in data capacity, still further increases have been desired, such as would be possible with a ½ inch wide tape having 64 or even 128 tracks. However, even when a head is indexed, there is a practical limit to the ability of a multi-track head to accurately and reliably record data to, and read data from, a tape having such a large number of very narrow tracks. Problems can be caused by track misregistrations, such as tape edge variations, environmental thermal expansion and contraction and inaccuracies in the path the tape follows in a drive, as well as by inaccuracies in the formatting of tracks on the tape itself. As can be appreciated, even a minute "wobble" in the head/tape relationship can result in significant signal degradation, such as crosstalk and dropout, when a ½ inch tape has 128 tracks, each with a width of about 80 microns.

One solution to the problem of minute wobbles is a tape head actuator which both indexes the tape head to one of several positions during track seek operations and also, rapidly and very accurately, servo controls the position of the head to precisely follow a track during track accessing operations. It will be appreciated that, in order to achieve the high degree of accuracy which is necessary, the position of the tape head relative to the tape must be precisely known.

Optical encoders, in which a code strip attached to a tape head moves through a channel between a light source and one or more detectors, can be used to measure the linear (and, therefore, the position) of the tape head. An example of a device which has been used in tape drives is the HEDS-9200 linear optical incremental encoder module sold by Hewlett Packard. However, depending upon the grating width of the code strip, the resolution of the encoder is only on the order of 127 microns, not sufficient to monitor the submicron positioning necessary for a 128 track, ½ inch tape drive such as the IBM 3590 tape subsystem. More precise encoders are available but are very expensive.

SUMMARY OF THE INVENTION

In view of the foregoing, it is an object of the present invention to provide a low cost position sensor with very high resolution, such as less than one micron.

It is another object to employ an existing, low resolution encoder in the position sensor to achieve very high resolution.

These and other objects are achieved in this invention by providing a low cost, low resolution optical encoder, processing analog signals from the encoder to obtain substantially linear signal segments of known lengths which, when joined, allow accurate monitoring of physical displacement of an item to which the encoder is attached.

More specifically, a controller receives two analog signals from encoder and adjusts the gain and offset of the signals. The segment lengths are then measured and adjusted if necessary so that the sum of the four lengths is a known value; the adjusted lengths are stored in a memory.

When the item (such as a movable head in a magnetic tape drive) is to be used, the item is first moved to a known reference position. The item can then be moved during its normal operation. Based upon the processed signals from the encoder, the current position of the item can be measured with high accuracy.

The foregoing and other features and advantages of the invention will be apparent from the following more particular description of preferred embodiments of the invention, as illustrated in the accompanying drawings.

DETAILED DESCRIPTION OF THE INVENTION

Figure 1:
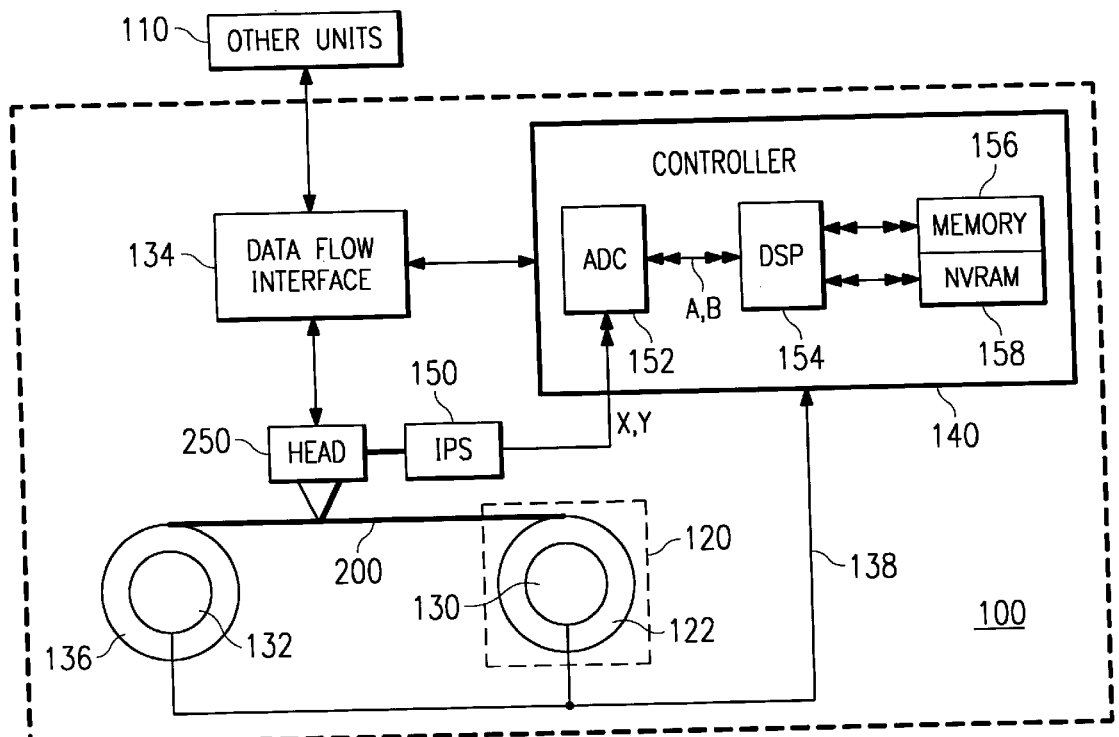
FIG. 1 is a block diagram of a tape device employing the present invention.

Referring now to the appended drawing in which like numerals indicate like parts and structural features in the various figures, FIG. 1 is a block diagram of a tape drive 100 connected to other units 110, such as external peripheral controllers, computers of all types, communication systems, local networks and the like. A tape cartridge 120 containing a single spool 122 of magnetic tape 200 is removably inserted into the tape drive 100. The tape cartridge 120 shown in a play position operatively connects a spool motor and tachometer 130 to the cartridge spool 122 for unreeling and reeling the tape 200. The tape 200 is automatically threaded past a laterally-positionable, multi-track, multi-gap tape head 250 to a second spool 132. Data are transferred between the tape 200 and the other units 110 through a data flow interface 134. The data flow interface 134 performs the usual formatting, error detecting and correcting, and other processing of information-bearing signals (data) found in the magnetic tape recording apparatus 100. A second motor and tachometer 136 rotates the second spool 132 in synchronism with the cartridge spool 122. Lines 138 denote control and sensing signal transfer connections between the motors 130 and 136 and a tape device controller 140. The controller 140 includes programmed control for controlling the data flow interface 134 and communicating with the other units 110.

An independent position sensor (IPS) 150 is physically coupled to the head 250 and transmits two output signals to an analog to digital converter (ADC) 152 within the controller 140. A digital signal processor (DSP) 154 within the controller 140 is interconnected with the ADC 152. The controller 140 also includes a memory 156 and a non-volatile memory 158.

Figure 2:
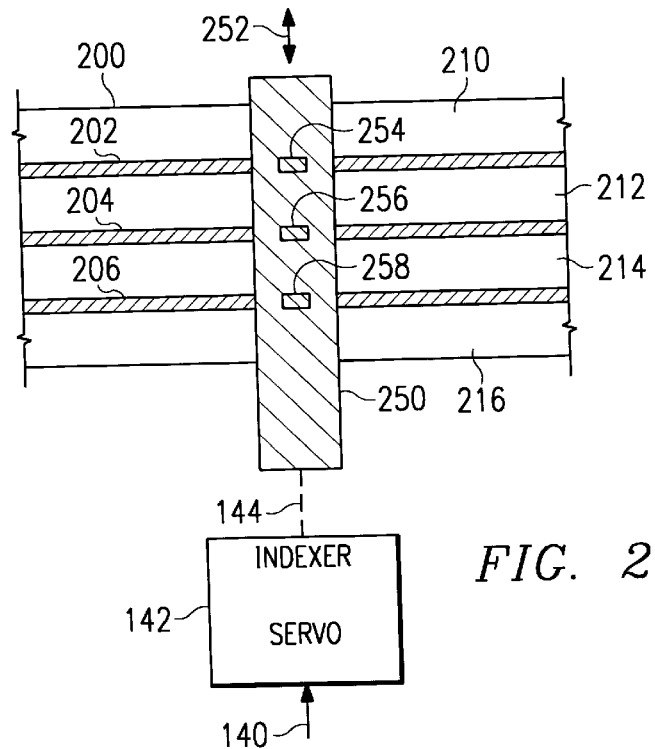
FIG. 2 illustrates a transducer which is indexed and servo-positioned with respect to servo areas on a magnetic tape.

FIG. 2 illustrates how the head 250 is indexed laterally across the magnetic tape 200 in the directions indicated by the arrow 252. The exemplary magnetic head 250 has three sets of servo elements 254, 256 and 258 which separate four data track areas 210, 212, 214 and 216 and concurrently sense the servo track areas 202, 204 and 206, respectively. Each data track area 210–216 contains multiple data tracks arranged in a known manner in "clusters". The sensed servo signals are processed to generate a servo drive signal on line 140 for actuating a servo 142 to move the head 250 to follow the servo tracks 202–206. Numeral 144 indicates the mechanical connection of the head 250 to the servo 142.

On a ½ inch magnetic tape for an IBM 3590 tape drive having 128 recording tracks, each track has a width of about 80 microns; there is a narrow direction buffer between track clusters (every four tracks, for example) and guard bands at both edges of the tape 200. When the tape 200 is loaded into the drive 100, the servo/indexer 142 must very precisely position the head 250 in one of several index positions. Then, the servo elements 254–258 sense the servo pattern to automatically enable switching from the open loop indexing to servo track following, thereby allowing data read/write elements on the head 250 to read/write data from/to tracks in the selected track cluster. When tape movement is halted (or when servo signals are otherwise lost), track following also ceases and it is necessary for the indexer 142 to precisely maintain the position of the head 250 so that track following can be restored immediately when tape movement begins again (or when servo signal are restored).

Figure 3:
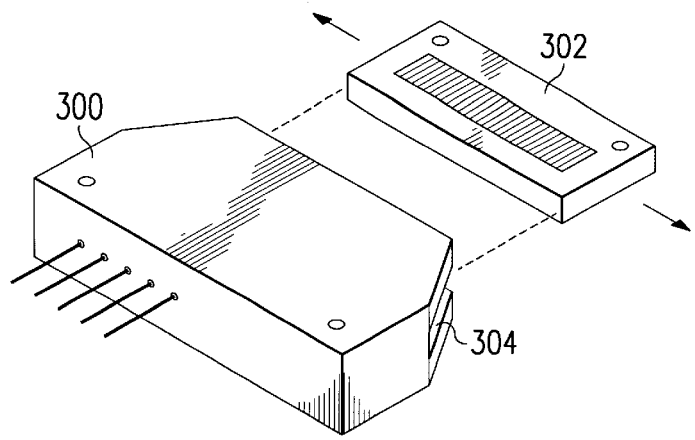
FIG. 3 illustrates an optical encoder useable as a position sensor with the present invention.
Figure 4:
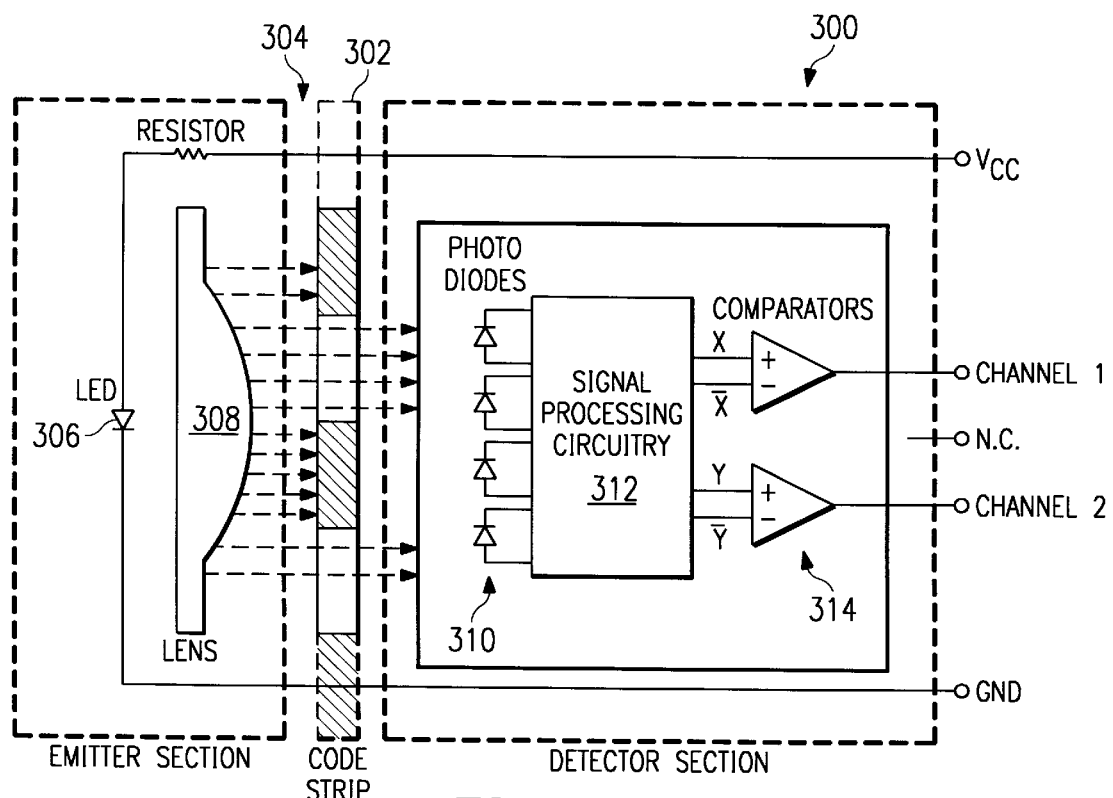
FIG. 4 is a block diagram of the encoder of FIG. 3.

FIG. 3 illustrates an optical encoder 300 (an HEDS-9200 linear optical incremental encoder module sold by Hewlett Packard) which can be used as the IPS 150 in the present invention. A code strip 302 is secured to the tape head 250 and moves through a channel 304 in the encoder 300 in the directions indicated by the arrows. FIG. 4 is a block diagram of the encoder 300 illustrating how light from a light source 306 is directed through a lens 308 and strikes the code strip 302 passing through the channel 304. A grating pattern on the code strip 302 alternately blocks and passes light to be detected by one or more sensors 310 in an array. The outputs of the sensors 310 are processed by circuitry 312 and two comparators 314 which output two digital channels 1 and 2 which are 90° out of phase. As is known, the digital signals can be used to determine the distance in microns which the code strip 302 has travelled from a known reference position. However, the resolution of the above procedure using a code strip having 127-micron grating is only about 31.75 microns, not great enough for the sub-micron resolution necessary to accurately maintain the position of the tape head 250 relative to the 128-track tape 200.

Figure 5:
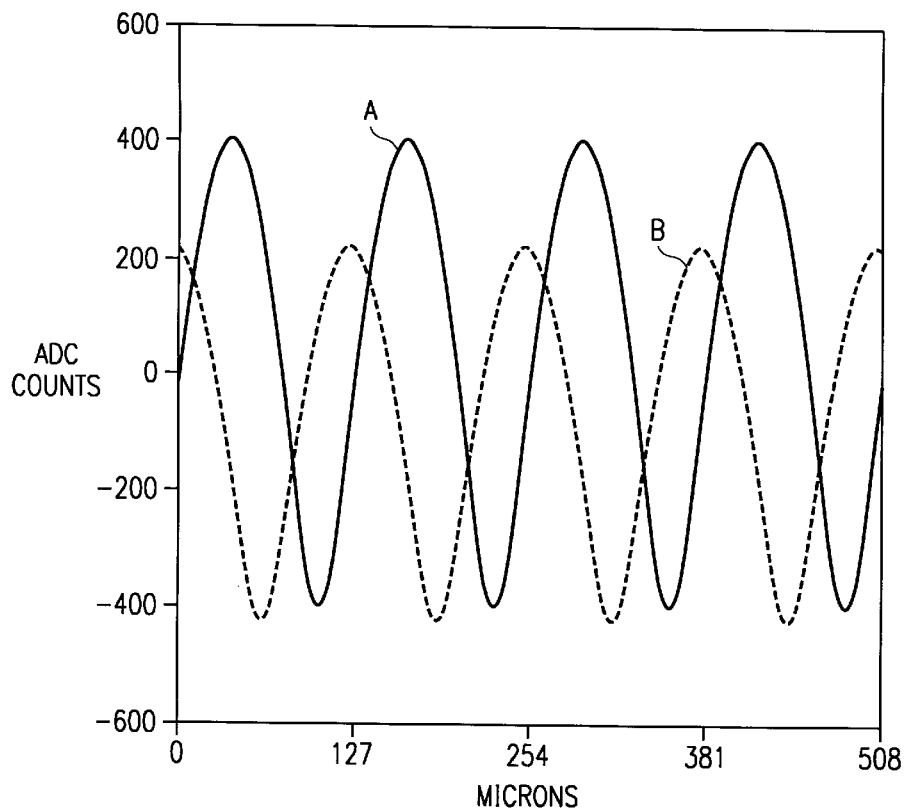
FIG. 5 is a plot of digitized outputs of the encoder of FIG. 3 in which distortions in gain, offset and symmetry have been exaggerated.

Rather than using signals from the two channels 1 and 2 from the comparators 314, the present invention employs two analog output signals X and Y from the signal processing circuit 312. The signals X and Y are digitized by the ADC 152 and are, shown plotted in FIG. 5. Several distortions are present in the signals A and B which the present invention first corrects before a position measurement with sub-micron resolution can be made. The distortions cause the signals A and B to: 1) have different peak-to-peak amplitudes (gain); 2) have different DC levels (offset); and 3) be asymmetrical relative to the zero-crossing (that is, the portion of the waveforms which is above the zero level may be wider or narrower than the portion which is below the zero level). For purposes of illustration, the distortions have been greatly exaggerated in FIG. 5.

Figure 6:
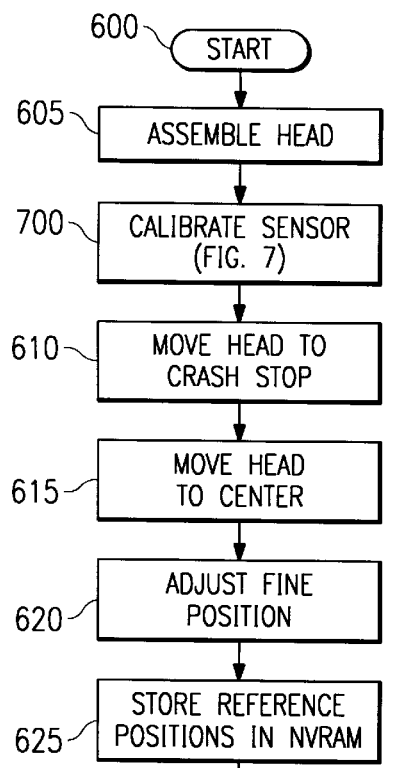
FIG. 6 is a flowchart of a tape head assembly procedure of the present invention.

Turning now to the flowchart of FIG. 6, an initial procedure (Step 600) will be described. When the tape head 250 is first assembled with the encoder 300 (Step 605) (and each time the tape drive 100 is powered on or a tape is unloaded from the drive 100), the encoder 300 is calibrated (Step 700) in accordance with the steps shown in the flowchart of FIG. 7 (which is described below). After the encoder has been calibrated, current is applied to the head actuator 142 (Step 610) to move the head 250 to a crash stop, defining a first known reference position. The head 250 is then physically moved (by an assembler or by a machine) to an approximate center position (Step 615) to nominally place the servo elements 254–258 over the servo areas 202–206. The assembler (or machine) uses a microscope to perform a very fine adjustment to position the servo elements 254–258 precisely over the servo areas 202–206 (Step 620) defining a second known reference position. Both the first and second reference positions of the head 250 are stored in the NVRAM device 158 (Step 625) in the controller 140 and the drive 100 can be shipped to a customer and installed.

Figure 7:
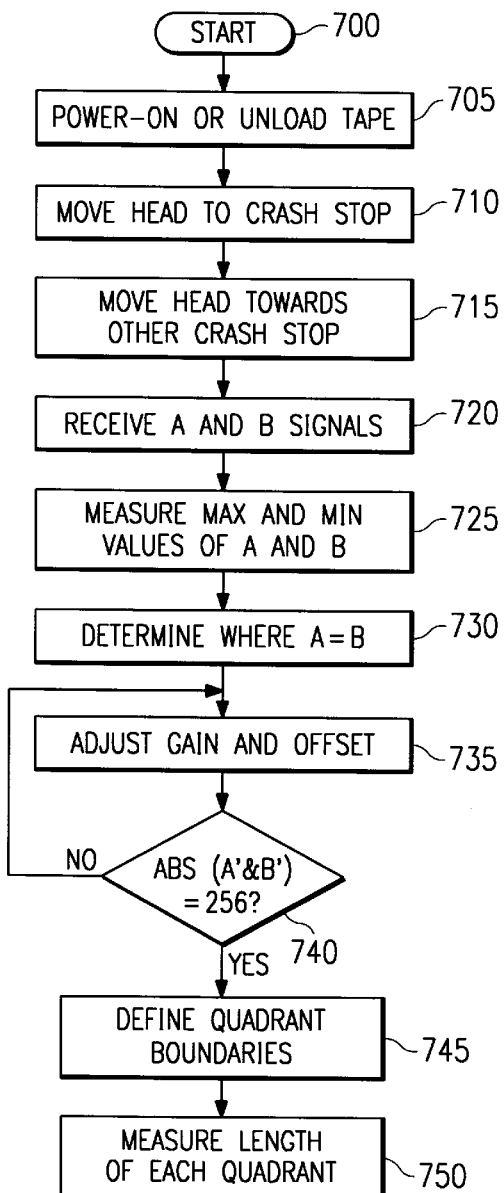
FIG. 7 is a flowchart of the encoder calibration procedure of the present invention.
Figure 7:
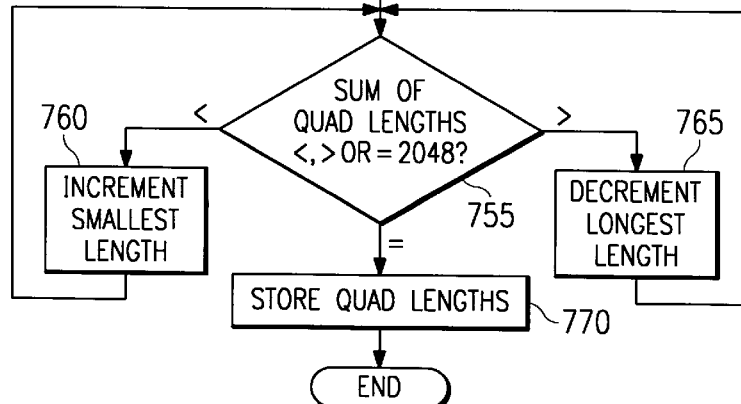

The flowchart of FIG. 7 sets forth the steps of the procedure to calibrate the ADC outputs A and B from the encoder 300. When the tape head 250 is initially assembled (FIG. 6), each time the drive 100 is powered on and each time a tape 200 is unloaded from the drive 100 (Step 705), current is applied to the head actuator to move the head 250 to the crash stop reference position (Step 710); current is then applied to move the head 250 in a full stroke towards the opposite crash stop (Step 715). The two signals X and Y are received from the encoder 300 (Step 720), processed through the ADC 152 and DSP 154 and their maximum and minimum values are noted as the head moves (Step 725). The control program also determines the positive and negative values at which the signals A and B are substantially equal (that is, within a small, predetermined margin of error of each other) (Step 730).

Figure 8:
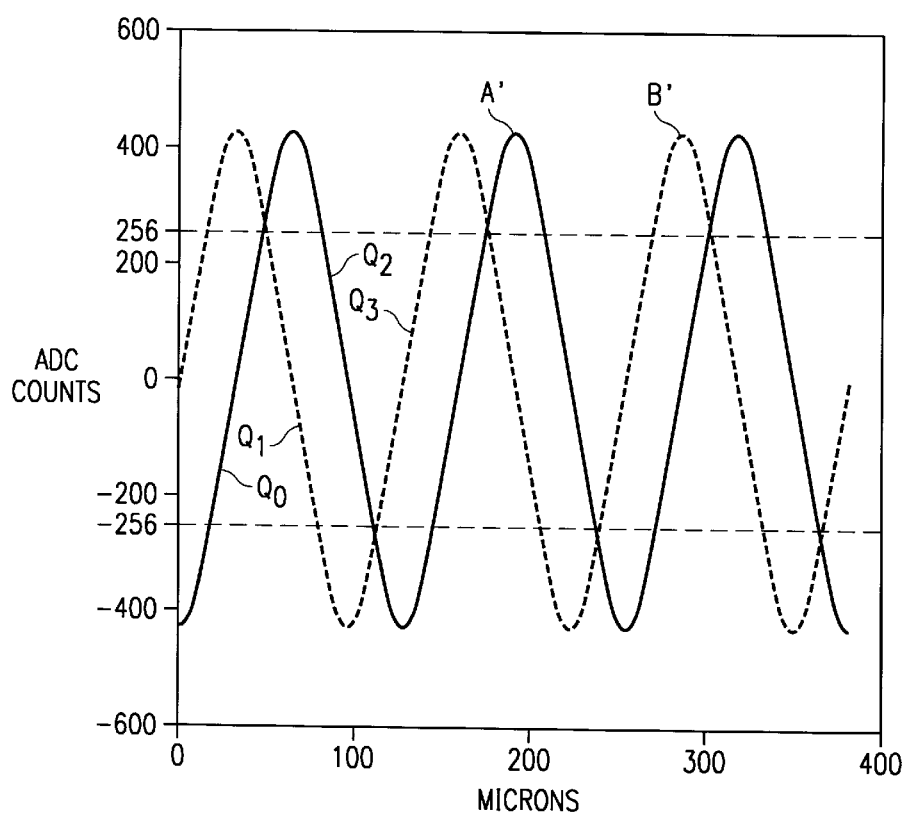
FIG. 8 is a plot of the outputs of the present invention after distortions in gain and offset have been corrected.

Once the signal data have been collected, the gains and offsets of the waveforms of the signals A and B are adjusted (Step 735) to equalize the two waveforms such that the average of the ADC counts at which the absolute values of point at which A and B cross is 256 (Step 740), resulting in substantially linear segments of 512 ADC counts each, centered about the zero level. FIG. 8 is a plot of the two signals A and B after distortions in gain and offset have been corrected (the corrected signals are now referred to as A' and B', respectively). Each combined period of the two waveforms is divided into the four linear segments of the waveforms, termed quadrants Q0, Q1, Q2 and Q3 (FIG. 8). The nominal boundaries of Q0 are from −A256 to +A256; the nominal boundaries of Q1 are from +B256 to −B256; the nominal boundaries of Q2 are from +A256 to −A256; and the nominal boundaries of Q3 are from −B256 to +B256 (Step 745). Because of variations in encoders, temperature changes and aging, the actual lengths of each of the four quadrants may differ from the nominal 512 ADC counts. Consequently, the actual lengths are determined (Step 750) by measuring the actual lengths of many of each quadrant and averaging. Then, to reduce errors which can accumulate during the process and to mitigate the effects of waveform asymmetries, the measured lengths are adjusted if necessary until the sum of the counts in all four quadrants equals 2048. First, the lengths are summed (Step 755). If the sum is less than 2048, then the length of the shortest quadrant is increased (Step 760). On the other hand, if the sum is greater than 2048, then the length of the longest quadrant is decreased (Step 765). The process is repeated until the sum equals 2048 (although each individual quadrant length may not equal 512) and the lengths are stored in the memory 156 in the controller 140 (Step 770).

Figure 9:
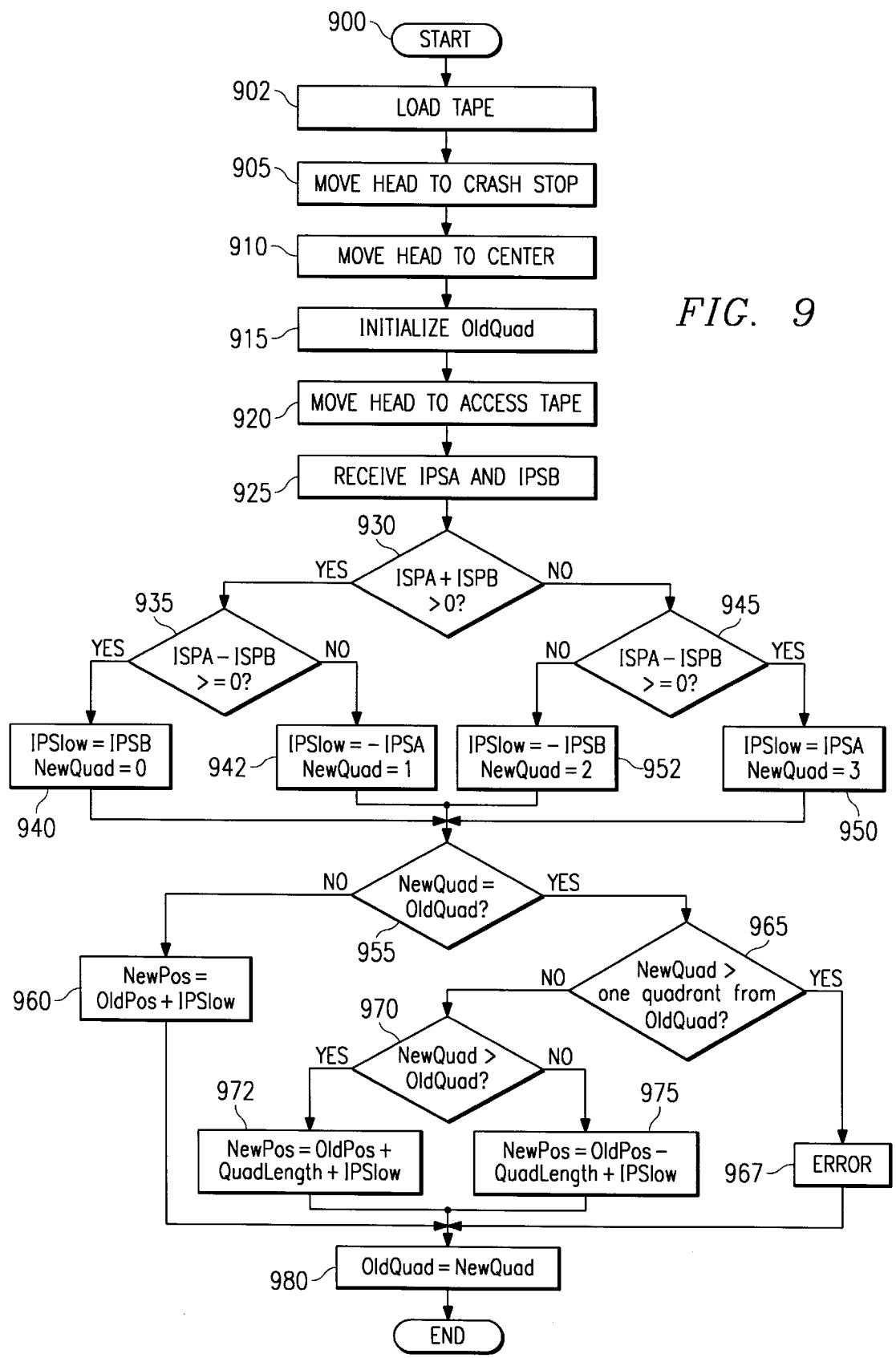
FIG. 9 is a flowchart of normal tape operations using the encoder of the present invention.

FIG. 9 is a flowchart of normal tape operations using the encoder of the present invention. After the drive 100 has been calibrated during a tape unload operation, it is ready for precise head position monitoring when a tape is next loaded. The head 250 is moved to the crash stop reference position (Step 905) and then moved to the center reference position (Step 910) using data stored in the NVRAM 158 during head assembly. The quadrant number is initialized with the current quadrant (OldQuad) (Step 915). The head 250 can then be moved under control of the index and servo controller 140 to access data on the tape 200 (Step 920). The signals A and B are sampled, for example, at a 10 kHz rate, (Step 925) to obtain the variables IPSA and IPSB and the new quadrant (NewQuad) is identified as follows:

If IPSA+IPSB>0 (Step 930) and if IPSA−IPSB≧0 (Step 935), then NewQuad=0 and IPSlow=IPSB (Step 940).

If IPSA+IPSB>0 but IPSA−IPSB<0, then NewQuad=1 and IPSlow=−IPSA (Step 942).

If IPSA+IPSB≦0 and if IPSA−IPSB≧0 (Step 945), then NewQuad=3 and IPSlow=IPSA (Step 950).

If IPSA+IPSB≦0 but IPSA−IPSB<0, then NewQuad=2 and IPSlow=−IPSB (Step 952).

If the current quadrant (NewQuad) is the same as the previous quadrant (OldQuad) (Step 955), then the current position in microns (NewPos) can be determined directly from: NewPos=OldPos±IPSlow (depending upon the direction of movement of the head 250 relative to the center reference position) (Step 960).

On the other hand, if the current quadrant is different from the previous quadrant, a error test is conducted. If the current quadrant is more than one quadrant away from the previous quadrant (Step 965), then the move has been too great and an error is noted (Step 967). However, if the current quadrant is adjacent the previous quadrant (in either direction), then the following procedure is run:

If NewQuad>OldQuad (indicating that the distance is increasing) (Step 970), then NewPos=OldPos+QuadLength+IPSlow, where QuadLength is the length of the quadrant of the previous sample (Step 972).

Otherwise (that is, if NewQuad<OldQuad, indicating that the distance is decreasing), then NewPos=OldPos−QuadLength+IPSlow (Step 975).

The value of OldQuad is updated with the value of NewQuad (Step 980).

Using the above processes with a Hewlett Packard HEDS-9200 linear optical incremental encoder module, modified to access the signals X and Y, a resolution of approximately 0.125 microns has been achieved and very precise monitoring of the position of the tape head is possible. While the invention has been particularly shown and described with reference to preferred embodiments thereof, it will be understood by those skilled in the art that various changes in form and details may be made therein without departing from the spirit and scope of the invention. For example, the present invention can be incorporated into an inkjet printer with an inexpensive encoder for very high resolution, but low cost, printing. It can also be incorporated into surveying devices and machining equipment. Moreover, the present invention is as applicable to applications using rotary encoders as it is to those using linear encoders.

What is claimed is:

1. A method of monitoring the displacement of an item, comprising the machine executable steps of:

moving an item whose displacement is to be monitored from an initial position;

receiving two analog signals X and Y from an optical encoder attached to the item;

converting the two analog signals X and Y into digital signals A and B having varying count values;

determining maximum and minimum count values of the digitized signals A and B;

determining at what count values the signals A and B are within a predetermined tolerance of each other;

processing the signals A and B by adjusting amplitude gain and offset values until the absolute values of the signals A and B substantially equals 256 counts, the processed signals now being referred to as signals A' and B';

measuring the lengths of each of two substantially linear segments of each of signals A' and B', the four measured segments being referred to as quadrants 1–4;

adjusting the values of the measured lengths until the sum of the measured lengths equals 2048 counts;

storing the adjusted values of the measured lengths in a memory device;

moving the item to an initial reference position whereby the processed signals A' and B' have an initial quadrant;

moving the item from the initial reference position in the course of normal use;

as the item is moved, receiving processed signals A' and B';

maintaining a current count value;

periodically determining the current quadrant in which of the processed signals A' and B';

when the current quadrant is different from the previously determined quadrant, resetting the current count value to zero; and determining the current position of the item based upon the lengths of quadrants through which the processed signals A' and B' have passed and the current count value.

2. In a magnetic tape drive having a mechanical loader, a tape head, at least one motor to transport a multi-track magnetic tape past the tape head from a first reel to a second reel, a servo mechanism for moving the tape head laterally relative to the tape, and a data flow interface for transmitting/receiving data and instructions to/from a host device, the improvement comprising:

an independent position sensor for detecting a first signal from an emitter and for generating analog signals X and Y based upon movement of the tape head;

an analog to digital converter coupled to receive the analog signals X and Y from said sensor and for generating digital signals A and B;

a digital signal processor coupled to receive the digital signals A and B from said analog to digital converter and for:

determining the positive and negative values at which the signals A and B are substantially equal; and adjusting a gain and offset of each of the signals A and B such that the value at which the signals A and B are substantially equal is a first predetermined value, the adjusted signals being A' and B', respectively, and each having two substantially linear segments, each segment having a length;

a controller interconnected with said digital signal processor for:

determining the length of each of the segments of the two signals A' and B';

summing the determined lengths; and adjusting at least one length if the sum does not equal a second predetermined value; and a memory for storing the adjusted length of each segment;

said controller further operable for executing the steps of:

directing the servo to move the tape head to a predetermined reference position, the predetermined reference position corresponding to an initial one of the four segments; and as the tape head moves relative to the magnetic tape:

monitoring the signals A' and B' and accumulating counts associated with digital values thereof;

determining a current segment corresponding to a current position of said tape head; and determining a current position of the tape head relative to the magnetic tape based upon the current segment and the accumulated counts associated with the signals A' and B'.

3. An independent position sensor for determining a position of a movable item, comprising:

a code strip secured to the movable item, said code strip having a grating pattern;

a light source directed to project light toward said code strip;

a sensor for detecting light projected through said code strip and for generating analog signals X and Y based upon movement of the tape head;

an analog to digital converter coupled to receive the analog signals X and Y from said sensor and for generating digital signals A and B;

a digital signal processor coupled to receive the digital signals A and B from said analog to digital converter and for:

determining the positive and negative values at which the signals A and B are substantially equal; and adjusting a gain and offset of each of the signals A and B such that the value at which the signals A and B are substantially equal is a first predetermined value, the adjusted signals being A' and B', respectively, and each having two substantially linear segments, each segment having a length;

means, interconnected with said digital signal processor, for:

determining the length of each of the segments of the two signals A' and B';

summing the determined lengths; and adjusting at least one length if the sum does not equal a second predetermined value; and a memory for storing the adjusted length of each segment;

said controller further operable for executing the steps of:

directing the servo to move the tape head to a predetermined reference position, the predetermined reference position corresponding to an initial one of the four segments; and as the item moves:

monitoring the signals A' and B' and accumulating counts associated with digital values thereof;

determining a current segment corresponding to a current position of said item; and determining a current position of the item based upon the current segment and the accumulated counts associated with the signals A' and B'.

* * * * *